United States Patent
Chen et al.

(10) Patent No.: US 12,394,094 B1
(45) Date of Patent: Aug. 19, 2025

(54) EXTRINSIC CALIBRATION PARAMETER GENERATING DEVICE, METHOD, AND NON-TRANSITORY COMPUTER READABLE STORAGE MEDIUM THEREOF

(71) Applicant: HTC Corporation, Taoyuan (TW)

(72) Inventors: Wei-Fan Chen, Taoyuan (TW); Chi Yuan Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/621,144

(22) Filed: Mar. 29, 2024

(51) Int. Cl.
  *G06T 7/80* (2017.01)
  *G06T 7/20* (2017.01)
  *G06V 10/44* (2022.01)

(52) U.S. Cl.
  CPC .................. *G06T 7/80* (2017.01); *G06T 7/20* (2013.01); *G06V 10/44* (2022.01); *G06T 2207/10048* (2013.01)

(58) Field of Classification Search
  CPC ... G06T 7/80; G06T 7/20; G06T 2207/10048; G06V 10/44
  See application file for complete search history.

(56) References Cited

U.S. PATENT DOCUMENTS

| | | | |
|---|---|---|---|
| 10,467,770 B2 | 11/2019 | Sato et al. | |
| 2018/0330521 A1 | 11/2018 | Samples et al. | |
| 2023/0326075 A1* | 10/2023 | Luo ........................ | G06T 7/292 348/106 |

FOREIGN PATENT DOCUMENTS

| | | |
|---|---|---|
| CN | 114051626 A | 2/2022 |
| CN | 110612506 B | 11/2022 |
| CN | 116194866 A | 5/2023 |
| TW | 202328760 A | 7/2023 |

OTHER PUBLICATIONS

Tripicchio Paolo et al., "Multi-Camera Extrinsic Calibration for Real-Time Tracking in Large Outdoor Environments", Journal of Sensor and Actuator Networks, vol. 11, No. 3, Jul. 29, 2022 (Jul. 29, 2022), p. 40, XP093180613, ISSN: 2224-2708, DOI: 10.3390/jsan11030040.
The search report of the corresponding European application No. EP 24177794.5 issued on Aug. 2, 2024.
The office action of the corresponding Taiwanese application No. TW113143863 issued on May 15, 2025.

* cited by examiner

*Primary Examiner* — Yassin Alata
(74) *Attorney, Agent, or Firm* — CKC & Partners Co., LLC (57) ABSTRACT

An extrinsic calibration parameter generating device, method, and non-transitory computer readable storage medium thereof are provided. The device calculates a base image capturing device pose based on the light-emitting points of a plurality of image frames. The device generates a first extrinsic calibration parameter corresponding to at least two image capturing devices based on the image frames, and the first extrinsic calibration parameter is a five-degree-of-freedom information. The device generates a second extrinsic calibration parameter corresponding to the at least two image capturing devices based on the base image capturing device pose and the first extrinsic calibration parameter, and the second extrinsic calibration parameter is six-degree-of-freedom information.

20 Claims, 4 Drawing Sheets

EXTRINSIC CALIBRATION PARAMETER GENERATING DEVICE, METHOD, AND NON-TRANSITORY COMPUTER READABLE STORAGE MEDIUM THEREOF

BACKGROUND

Field of Invention

The present invention relates to an extrinsic calibration parameter generating device, method, and non-transitory computer readable storage medium thereof. More particularly, the present invention relates to an extrinsic calibration parameter generating device, method, and non-transitory computer readable storage medium thereof that can efficiently generate extrinsic calibration parameters.

Description of Related Art

Users can perform pose tracking operations in Simultaneous localization and mapping (SLAM) system through electronic devices equipped with multiple cameras.

In the prior art, an electronic device equipped with multiple cameras will perform position calibration settings for the cameras during the manufacturing process. However, when the user uses the electronic device, the electronic device may cause abnormal displacement of the camera's position or direction due to some reasons (e.g., collision impact occurs), which will cause the extrinsic parameters used by the electronic device to perform tracking operations to change.

Accordingly, if the extrinsic parameters of the electronic device are not calibrated, the electronic device will not be able to correctly perform data alignment operations when performing various operations (e.g., device positioning operation, floor detection operation, depth assessment operation, image pass-through operation), thus reducing the user's service experience.

In addition, although in the prior art, extrinsic parameter calibration can be specifically performed by photographing feature points in the user environment. However, since the user environment may not necessarily have enough feature points for calibration (e.g., there are too many white walls around, or feature points are blocked), the feature pairing may be inaccurate, and the extrinsic parameter calibration cannot be performed correctly and efficiently.

Accordingly, there is an urgent need for an extrinsic calibration parameter generating technology that can efficiently generate external calibration parameters.

SUMMARY

An objective of the present disclosure is to provide an extrinsic calibration parameter generating device. The extrinsic calibration parameter generating device comprises at least two image capturing devices and a processor, and the processor is electrically connected to the at least two image capturing devices. Each of the at least two image capturing devices is configured to generate an image frame, and each of the image frames includes a plurality of light-emitting points on an external device. The processor calculates a base image capturing device pose based on the light-emitting points of the image frames. The processor generates a first extrinsic calibration parameter corresponding to the at least two image capturing devices based on the image frames, wherein the first extrinsic calibration parameter is a five-degree-of-freedom information. The processor generates a second extrinsic calibration parameter corresponding to the at least two image capturing devices based on the base image capturing device pose and the first extrinsic calibration parameter, wherein the second extrinsic calibration parameter is six-degree-of-freedom information.

Another objective of the present disclosure is to provide an extrinsic calibration parameter generating method, which is adapted for use in an electronic apparatus. The electronic apparatus comprises at least two image capturing devices, each of the at least two image capturing devices is configured to generate an image frame, and each of the image frames includes a plurality of light-emitting points on an external device. The extrinsic calibration parameter generating method comprises the following steps: calculating a base image capturing device pose based on the light-emitting points of the image frames; generating a first extrinsic calibration parameter corresponding to the at least two image capturing devices based on the image frames, wherein the first extrinsic calibration parameter is a five-degree-of-freedom information; and generating a second extrinsic calibration parameter corresponding to the at least two image capturing devices based on the base image capturing device pose and the first extrinsic calibration parameter, wherein the second extrinsic calibration parameter is six-degree-of-freedom information.

A further objective of the present disclosure is to provide a non-transitory computer readable storage medium having a computer program stored therein. The computer program comprises a plurality of codes, the computer program executes an extrinsic calibration parameter generating method after being loaded into an electronic apparatus. The electronic apparatus comprises at least two image capturing devices, each of the at least two image capturing devices is configured to generate an image frame, and each of the image frames includes a plurality of light-emitting points on an external device. The extrinsic calibration parameter generating method comprises the following steps: calculating a base image capturing device pose based on the light-emitting points of the image frames; generating a first extrinsic calibration parameter corresponding to the at least two image capturing devices based on the image frames, wherein the first extrinsic calibration parameter is a five-degree-of-freedom information; and; and generating a second extrinsic calibration parameter corresponding to the at least two image capturing devices based on the base image capturing device pose and the first extrinsic calibration parameter, wherein the second extrinsic calibration parameter is six-degree-of-freedom information.

The extrinsic calibration parameter generating technology (at least including the device, the method, and the non-transitory computer readable storage medium) provided by the present disclosure can calculate the base image capturing device pose by analyzing the light-emitting points in the image frames generated by different image capturing devices since the actual distance relationship between multiple light-emitting points on the external device is known information. In addition, the extrinsic calibration parameter generating technology provided by the present disclosure can efficiently generate the extrinsic calibration parameter of six-degrees-of-freedom information through the base image capturing device pose and the extrinsic calibration parameter of the five-degree-of-freedom information. The extrinsic calibration parameter generating technology provided by the present disclosure can be used for calibration assistance through the electronic device (e.g. controller, tracking device) held by the user during operation, without the need for additional calibration assistance devices. Therefore, the extrinsic calibration parameter can be quickly generated, which improves the accuracy of device execution and improves user service experience.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, an extrinsic calibration parameter generating device, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
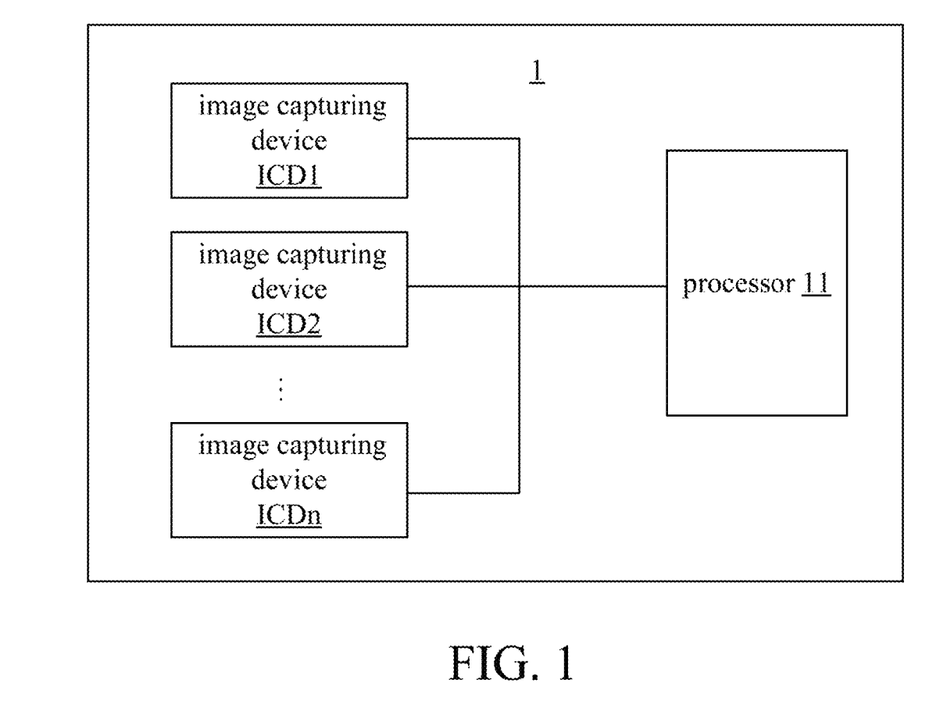
FIG. 1 is a schematic view depicting a extrinsic calibration parameter generating device of the first embodiment.

First, a first embodiment of the present disclosure is an extrinsic calibration parameter generating device 1 and a schematic view of which is depicted in FIG. 1. In the present embodiment, the extrinsic calibration parameter generating device 1 comprises image capturing devices ICD1, ICD2, . . . , ICDn and a processor 11, the processor 11 is electrically connected to the image capturing devices ICD1, ICD2, ICDn, and n is a positive integer.

It shall be appreciated that the processor 11 may be any of various processors, Central Processing Units (CPUs), microprocessors, digital signal processors or other computing apparatuses known to those of ordinary skill in the art. The image capturing devices ICD1, ICD2, . . . , ICDn may be image capturing devices with an image capturing function (e.g., a plurality of depth camera lenses) to generate a plurality of real-time images corresponding to a field of view (FOV) to perform a self-positioning operation of inside-out tracking.

It shall be appreciated that the present disclosure does not limit the number of image capturing devices included in the extrinsic calibration parameter generating device 1, as long as the extrinsic calibration parameter generating device 1 has two or more image capturing devices (i.e., at least two image capturing devices), the extrinsic calibration parameter corresponding to these image capturing devices can be calibrated through the present disclosure.

In some embodiments, the extrinsic calibration parameter generating device 1 may be a head-mounted display (HMD), and the head-mounted display generates the extrinsic calibration parameter to calibrate its plurality of image capturing devices.

In some embodiments, the extrinsic calibration parameter generating device 1 can also be implemented by an electronic device having a plurality of image capturing devices (for example: a controller, a tracking device).

In addition, the image capturing devices ICD1, ICD2, ICDn can be arranged at different positions of the extrinsic calibration parameter generating device 1 (e.g., left and right sides of the head-mounted display), and generate corresponding image frames with different image capture angles.

To facilitate understanding, the following description will be based on the extrinsic calibration parameter generating device 1 including two image capturing devices (i.e., the image capturing device ICD1 and the image capturing device ICD2). A person with ordinary knowledge in the art should be able to understand other implementations corresponding to the number of other image capturing devices based on the contents of the present disclosure, so no details are given here.

First, in the present embodiment, each of the image capturing device ICD1 and the image capturing device ICD2 are configured to generate an image frame, and each of the image frames includes a plurality of light-emitting points on an external device.

Figure 2A:
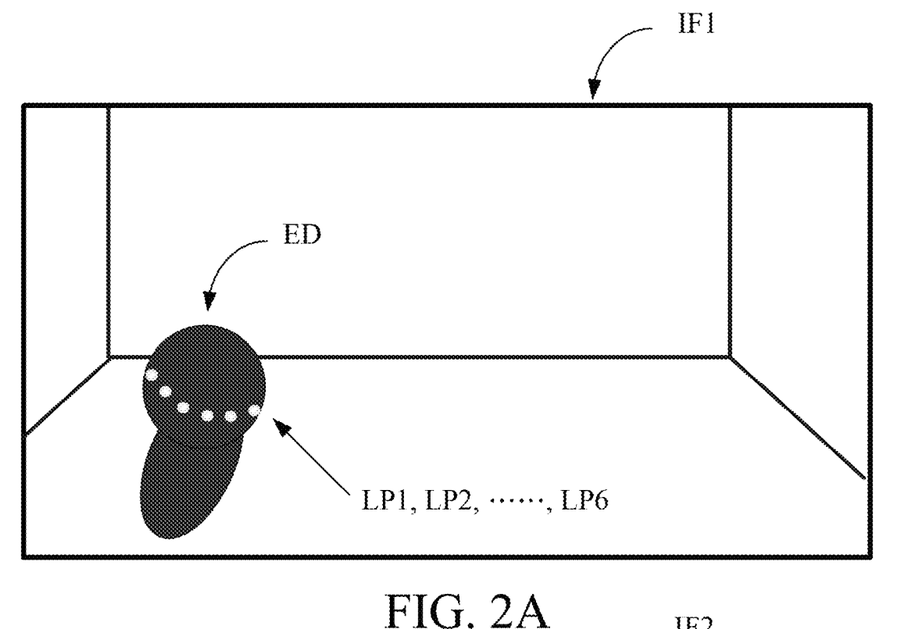
FIG. 2A is a schematic view depicting an image frame including light emitting points of an external device of some embodiment.
Figure 2B:
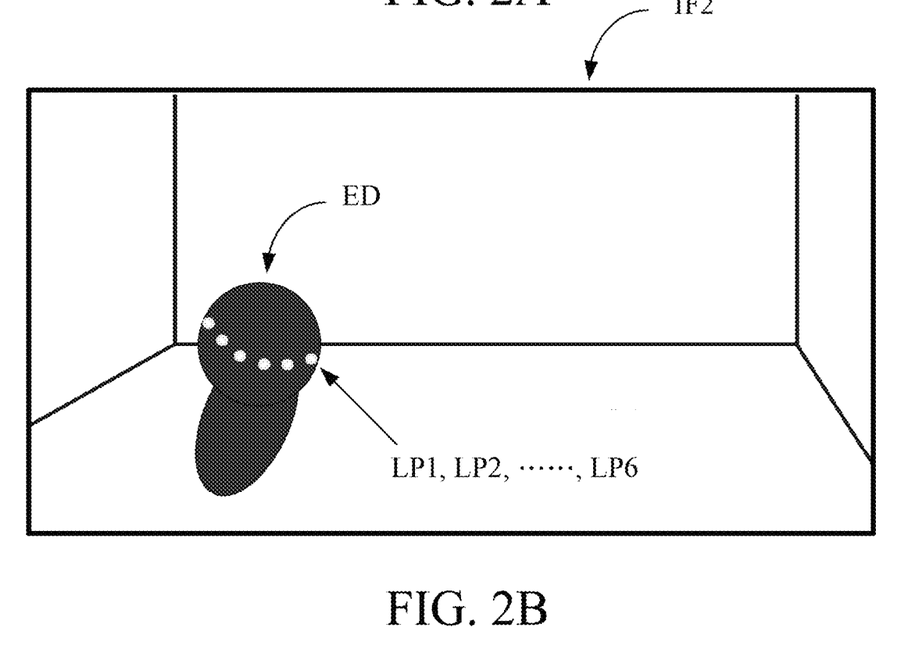
FIG. 2B is a schematic view depicting an image frame including light emitting points of an external device of some embodiment.

For ease of understanding, please refer to FIG. 2A and FIG. 2B. FIG. 2A and FIG. 2B illustrate the image frame IF1 generated by the image capturing device ICD1 and the image frame IF2 generated by the image capturing device ICD2. In the present example, the image frame IF1 includes six light-emitting points LP1, LP2, . . . , LP6 on the external device ED, and the image frame IF2 includes six light-emitting points LP1, LP2, . . . . LP6 on the external device ED.

In some embodiments, the external device ED may be a handle, a controller, a tracking device, etc. having a plurality of light-emitting points.

In some embodiments, the extrinsic calibration parameter generating device 1 itself can perform the tracking operation through the light-emitting points on the external device ED. Specifically, each of the light-emitting points on the external device ED is further configured to emit an infrared ray. The processor 11 performs a tracking operation corresponding to the external device ED based on the infrared rays emitted by each of the light-emitting points.

It shall be appreciated that the light-emitting points may have their own defined mark shapes and sequences to speed up their identification by the extrinsic calibration parameter generating device 1. In addition, since the real distance information of the light-emitting points to each other is known information and will not change, the present disclosure can use the value of the real distance of each of the light-emitting points as the baseline length/ground truth for the adjustment operation to supplement the dimension of the true distance of the translation (e.g., a scaling factor), and thus improve the efficiency of calculating the extrinsic calibration parameter.

Next, in the present embodiment, the processor 11 calculates a base image capturing device pose based on the light-emitting points of the image frames.

It shall be appreciated that the processor 11 selects one of the image capturing device ICD1 and the image capturing device ICD2 as the base image capturing device (i.e., using the coordinate system of the base image capturing device as the reference origin). Specifically, the base image capturing device pose corresponds to one of the at least two image capturing devices.

In some embodiments, the processor 11 calculates the base image capturing device pose based on a three-dimensional coordinate information of each of the light-emitting points and a two-dimensional feature pairing information.

It shall be appreciated that the processor 11 can estimate the camera pose (i.e., the base image capturing device pose) based on the mappoints in the three-dimensional space and the feature pairing information in two-dimensional. In some embodiments, the processor 11 can estimate the camera pose through Perspective-n-Points (PnP) algorithm.

In some embodiments, the processor 11 may compare the light-emitting points of each of the image frames to calculate the two-dimensional feature pairing information corresponding to the image frames. Taking FIG. 2A and FIG. 2B as an example, since the six light-emitting points LP1, LP2, . . . , LP6 on the external device ED are known information, the processor 11 can quickly identify that the light-emitting point LP1 in the image frame IF1 corresponds to the light-emitting point LP1 in the image frame IF2, the light-emitting point LP2 in the image frame IF1 corresponds to the light-emitting point LP2 in the image frame IF2, and so on.

In some embodiments, the processor 11 can evaluate the position of the external device ED in the space by using special feature points of the infrared light-emitting points and inversely calculate the position of the light-emitting points in the space. Specifically, the processor 11 calculates the three-dimensional coordinate information of each of the light-emitting points based on the two-dimensional feature pairing information and a distance relationship between the light-emitting points on the external device.

In some embodiments, in order to make the light-emitting points on the external device ED easy to identify, the image frame is generated by the image capturing device with low exposure value parameters. Specifically, the image frames are generated by the at least two image capturing devices based on a low exposure value parameter.

It shall be appreciated that since the present disclosure uses an external device ED with light-emitting points to perform dynamic calibration, in addition to completing dynamic calibration without the assistance of additional equipment, calibration can also be performed in an environment where feature point identification is poor (e.g., an environment with insufficient feature points or an environment with insufficient light sources).

Next, the processor 11 generates a first extrinsic calibration parameter corresponding to the at least two image capturing devices based on the image frames, wherein the first extrinsic calibration parameter is a five-degree-of-freedom information.

For example, the first extrinsic calibration parameter can be configured to calibrate the relative rotation angle and the relative direction of one image capturing device relative to another image capturing device.

It shall be appreciated that the operation of calculating the base image capturing device pose and the operation of generating the first extrinsic calibration parameter do not have a limitation in quantity and order. For example, the operation of calculating the base image capturing device pose and the operation of generating the first extrinsic calibration parameter may be performed in multiple iterations. In addition, the operation of calculating the base image capturing device pose and the operation of generating the first extrinsic calibration parameter can be processed simultaneously and in parallel.

In some embodiments, the processor 11 can generate the first extrinsic calibration parameter through an epipolar geometry algorithm. Specifically, in a system with multiple image capturing devices, feature points in the image frames captured by two image capturing devices at the same time (for example, image frame IF1 and image frame IF2) can be extracted and matched. According to the epipolar constraints, the real extrinsic parameters and internal parameters between the two image capturing devices should make the feature points in the image frame IF2 fall on the epipolar line, and this epipolar line is a straight line projected onto the image frame IF2 based on the feature pairing of the feature points in the image frame IF2 in the image frame IF1 according to the extrinsic parameters and internal parameters. The processor 11 can estimate a set of extrinsic parameters to minimize the distance between the feature point and the epipolar line.

It shall be appreciated that since the length of the baseline cannot be limited in the constraints of the epipolar geometry, the extrinsic calibration parameter generated is only an extrinsic parameter with five-degrees-of-freedom information (i.e., lacking true distance information).

Finally, the processor 11 generates a second extrinsic calibration parameter corresponding to the at least two image capturing devices based on the base image capturing device pose and the first extrinsic calibration parameter, wherein the second extrinsic calibration parameter is six-degree-of-freedom information.

It shall be appreciated that when two or more image capturing devices observe the same feature point position, the triangle alignment algorithm can be used to calculate the error. When multiple sets of feature points are observed at different time points, the processor 11 can perform regression calculation and minimize Error, optimize the extrinsic parameters of more than two image capturing devices, and simultaneously calibrate the external device ED to perform geometric fine-tuning calibration, which can also improve the accuracy of external device ED tracking.

In some embodiments, the processor 11 can generate extrinsic calibration parameters through iteration of the bundle adjustment method. Specifically, the processor 11 generates a three-dimensional coordinate information corresponding to a coordinate system of each of the light-emitting points based on the coordinate system corresponding to the base image capturing device pose. Next, the processor 11 performs a bundle adjustment based on the first extrinsic calibration parameter and the three-dimensional coordinate information corresponding to the coordinate system corresponding to each of the light-emitting points to generate the second extrinsic calibration parameter.

It shall be appreciated that since the present disclosure first calculates the first extrinsic calibration parameter with partially accurate information and uses it as the initial input value of the bundle adjustment method, it can significantly reduce the number of iterations of the bundle adjustment method.

In some embodiments, the second extrinsic calibration parameter can be used to calibrate positioning information. Specifically, the processor 11 calibrates the positioning information corresponding to the at least two image capturing devices based on the second extrinsic calibration parameter.

In some embodiments, in order to generate the second extrinsic calibration parameter more accurately, the processor 11 may also perform the aforementioned operation based on an image frame including a plurality of light-emitting points on a plurality of external devices.

Figure 3A:
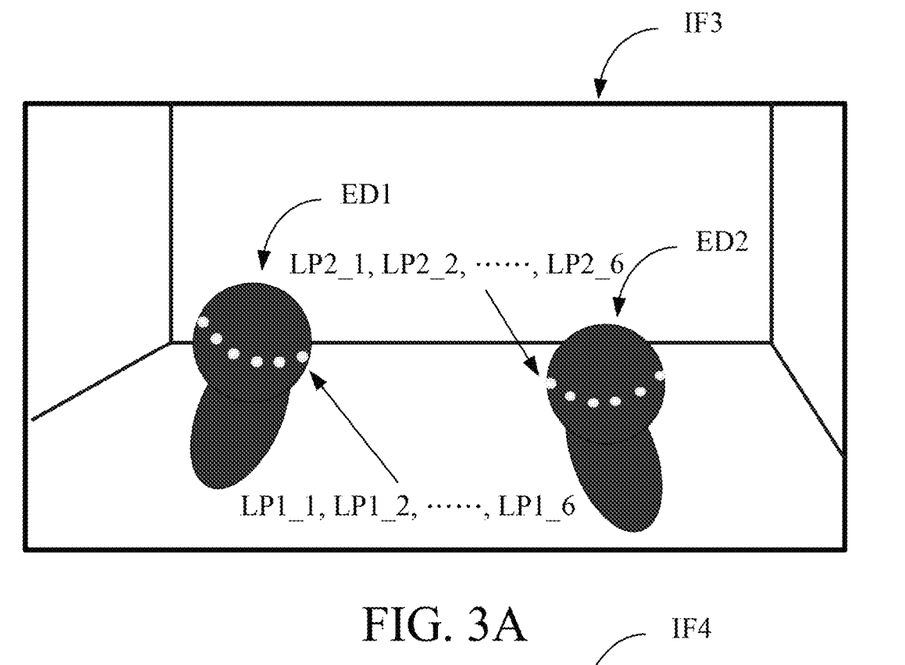
FIG. 3A is a schematic view depicting an image frame including light emitting points of two external devices of some embodiment.
Figure 3B:
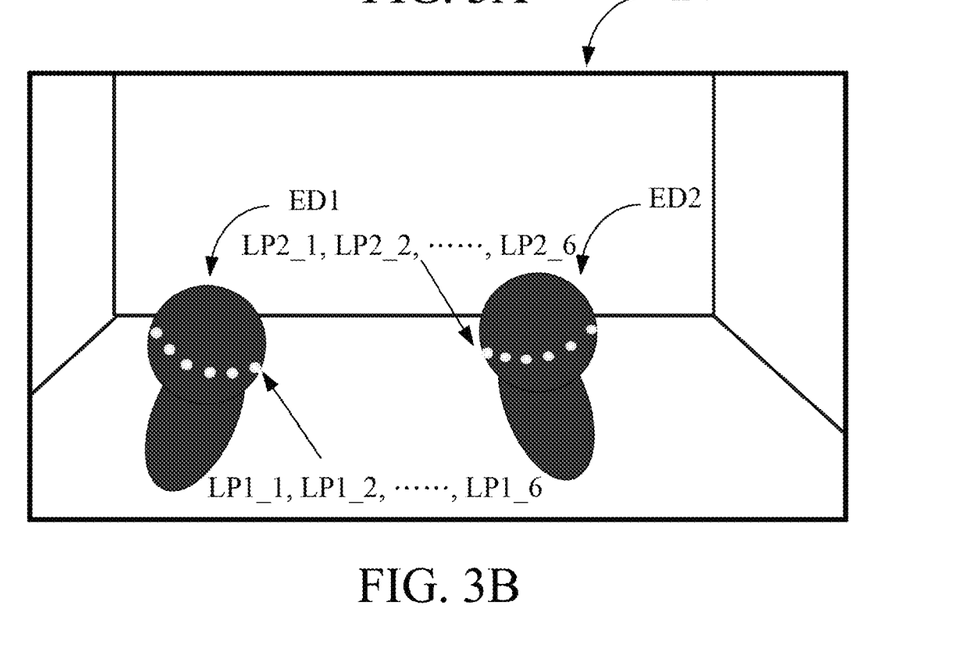
FIG. 3B is a schematic view depicting an image frame including light emitting points of two external devices of some embodiment.

For ease of understanding, please refer to FIG. 3A and FIG. 3B. FIG. 3A and FIG. 3B illustrate the image frame IF3 generated by the image capturing device ICD1 and the image frame IF4 generated by the image capturing device ICD2. In the present example, the image frame IF3 includes six light-emitting points LP1_1, LP1_2, . . . . LP1_6 on the external device ED1 and six light-emitting points LP2_1, LP2_2, . . . , LP2_6 on the external device ED2. The image frame IF4 includes six light-emitting points LP1_1, LP1_2, . . . , LP1_6 on the external device ED1 and six light-emitting points LP2_1, LP2_2, . . . , LP2_6 on the external device ED2.

In the present example, the processor 11 can perform the aforementioned operation of generating the second extrinsic calibration parameter based on the image frame IF3 and the image frame IF4 including the light-emitting points on the external device ED1 and the external device ED2, so as to generate a more accurate second extrinsic calibration parameter.

According to the above descriptions, the extrinsic calibration parameter generating device 1 provided by the present disclosure can calculate the base image capturing device pose by analyzing the light-emitting points in the image frames generated by different image capturing devices since the actual distance relationship between multiple light-emitting points on the external device is known information. In addition, the extrinsic calibration parameter generating device 1 provided by the present disclosure can efficiently generate the extrinsic calibration parameter of six-degrees-of-freedom information through the base image capturing device pose and the extrinsic calibration parameter of the five-degree-of-freedom information. The extrinsic calibration parameter generating device 1 provided by the present disclosure can be used for calibration assistance through the electronic device (e.g. controller, tracking device) held by the user during operation, without the need for additional calibration assistance devices. Therefore, the extrinsic calibration parameter can be quickly generated, which improves the accuracy of device execution and improves user service experience.

Figure 4:
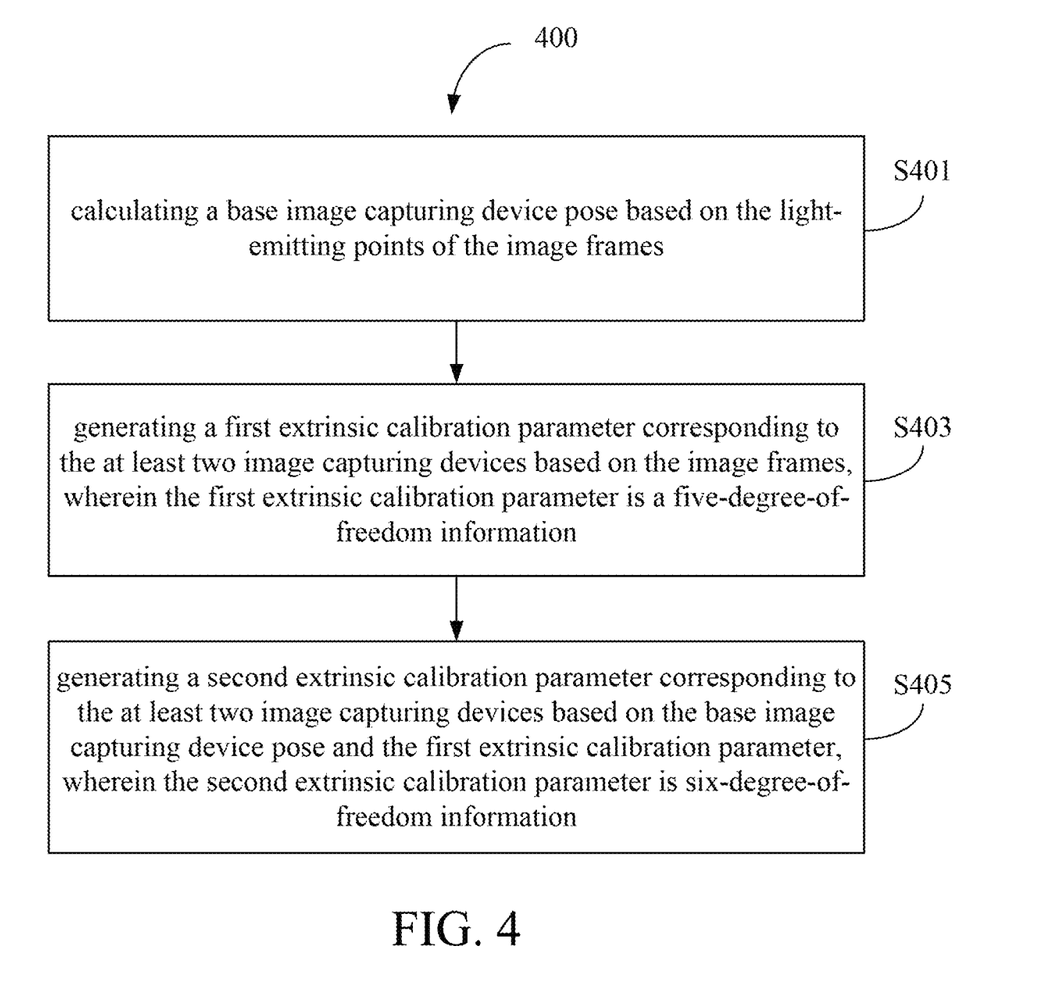
FIG. 4 is a partial flowchart depicting an extrinsic calibration parameter generating method of the second embodiment.

A second embodiment of the present disclosure is an extrinsic calibration parameter generating method and a flowchart thereof is depicted in FIG. 4. The extrinsic calibration parameter generating method 400 is adapted for an electronic apparatus (e.g., the extrinsic calibration parameter generating device 1 of the first embodiment). The electronic apparatus comprises at least two image capturing devices (e.g., the image capturing devices ICD1, ICD2, ICDn of the first embodiment). Each of the at least two image capturing devices is configured to generate an image frame, and each of the image frames includes a plurality of light-emitting points on an external device. The extrinsic calibration parameter generating method 400 generates an extrinsic calibration parameter through the steps S401 to S405.

In the step S401, the electronic apparatus calculates a base image capturing device pose based on the light-emitting points of the image frames.

Next, in the step S403, the electronic apparatus generates a first extrinsic calibration parameter corresponding to the at least two image capturing devices based on the image frames, wherein the first extrinsic calibration parameter is a five-degree-of-freedom information.

Finally, in the step S405, the electronic apparatus generates a second extrinsic calibration parameter corresponding to the at least two image capturing devices based on the base image capturing device pose and the first extrinsic calibration parameter, wherein the second extrinsic calibration parameter is six-degree-of-freedom information.

In some embodiments, the extrinsic calibration parameter generating method 400 further comprises the following steps: calibrating a positioning information corresponding to the at least two image capturing devices based on the second extrinsic calibration parameter.

In some embodiments, the base image capturing device pose corresponds to one of the at least two image capturing devices.

In some embodiments, the step of calculating the base image capturing device pose further comprises the following steps: calculating the base image capturing device pose based on a three-dimensional coordinate information of each of the light-emitting points and a two-dimensional feature pairing information.

In some embodiments, the step of calculating the two-dimensional feature pairing information further comprises the following steps: comparing the light-emitting points of each of the image frames to calculate the two-dimensional feature pairing information corresponding to the image frames.

In some embodiments, the step of calculating the three-dimensional coordinate information of each of the light-emitting points further comprises the following steps: calculating the three-dimensional coordinate information of each of the light-emitting points based on the two-dimensional feature pairing information and a distance relationship between the light-emitting points on the external device.

In some embodiments, the image frames are generated by the at least two image capturing devices based on a low exposure value parameter.

In some embodiments, each of the light-emitting points is further configured to emit an infrared ray, and the extrinsic calibration parameter generating method further comprises the following steps: performing a tracking operation corresponding to the external device based on the infrared rays emitted by each of the light-emitting points.

In some embodiments, the step of generating the second extrinsic calibration parameter further comprises the following steps: generating, based on a coordinate system corresponding to the base image capturing device pose, a three-dimensional coordinate information corresponding to the coordinate system of each of the light-emitting points; and performing a bundle adjustment based on the first extrinsic calibration parameter and the three-dimensional coordinate information corresponding to the coordinate system corresponding to each of the light-emitting points to generate the second extrinsic calibration parameter.

In addition to the aforesaid steps, the second embodiment can also execute all the operations and steps of the extrinsic calibration parameter generating device 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The extrinsic calibration parameter generating method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the extrinsic calibration parameter generating device 1), the computer program executes the extrinsic calibration parameter generating method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., the extrinsic calibration parameter.) are preceded by terms such as "first", or "second", and these terms of "first", or "second" are only used to distinguish these different words. For example, the "first" and "second" extrinsic calibration parameter are only used to indicate the extrinsic calibration parameter used in different operations.

According to the above descriptions, The extrinsic calibration parameter generating technology (at least including the device, the method, and the non-transitory computer readable storage medium) provided by the present disclosure can calculate the base image capturing device pose by analyzing the light-emitting points in the image frames generated by different image capturing devices since the actual distance relationship between multiple light-emitting points on the external device is known information. In addition, the extrinsic calibration parameter generating technology provided by the present disclosure can efficiently generate the extrinsic calibration parameter of six-degrees-of-freedom information through the base image capturing device pose and the extrinsic calibration parameter of the five-degree-of-freedom information. The extrinsic calibration parameter generating technology provided by the present disclosure can be used for calibration assistance through the electronic device (e.g. controller, tracking device) held by the user during operation, without the need for additional calibration assistance devices. Therefore, the extrinsic calibration parameter can be quickly generated, which improves the accuracy of device execution and improves user service experience.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An extrinsic calibration parameter generating device, comprising:
   at least two image capturing devices, wherein each of the at least two image capturing devices is configured to generate an image frame, and each of the image frames includes a plurality of light-emitting points on an external device; and
   a processor, being electrically connected to the at least two image capturing device, and being configured to perform operations comprising:
   calculating a base image capturing device pose based on the light-emitting points of the image frames;
   generating a first extrinsic calibration parameter corresponding to the at least two image capturing devices based on the image frames, wherein the first extrinsic calibration parameter is a five-degree-of-freedom information; and
   generating a second extrinsic calibration parameter corresponding to the at least two image capturing devices based on the base image capturing device pose and the first extrinsic calibration parameter, wherein the second extrinsic calibration parameter is six-degree-of-freedom information.

2. The extrinsic calibration parameter generating device of claim 1, wherein the processor is further configured to perform the following operations:
   calibrating a positioning information corresponding to the at least two image capturing devices based on the second extrinsic calibration parameter.

3. The extrinsic calibration parameter generating device of claim 1, wherein the base image capturing device pose corresponds to one of the at least two image capturing devices.

4. The extrinsic calibration parameter generating device of claim 1, wherein the operation of calculating the base image capturing device pose further comprises the following operations:
   calculating the base image capturing device pose based on a three-dimensional coordinate information of each of the light-emitting points and a two-dimensional feature pairing information.

5. The extrinsic calibration parameter generating device of claim 4, wherein the operation of calculating the two-dimensional feature pairing information further comprises the following operations:
   comparing the light-emitting points of each of the image frames to calculate the two-dimensional feature pairing information corresponding to the image frames.

6. The extrinsic calibration parameter generating device of claim 4, wherein the operation of calculating the three-dimensional coordinate information of each of the light-emitting points further comprises the following operations:
   calculating the three-dimensional coordinate information of each of the light-emitting points based on the two-dimensional feature pairing information and a distance relationship between the light-emitting points on the external device.

7. The extrinsic calibration parameter generating device of claim 4, wherein the image frames are generated by the at least two image capturing devices based on a low exposure value parameter.

8. The extrinsic calibration parameter generating device of claim 1, wherein each of the light-emitting points is further configured to emit an infrared ray, and the processor further performs the following operations:

performing a tracking operation corresponding to the external device based on the infrared rays emitted by each of the light-emitting points.

9. The extrinsic calibration parameter generating device of claim 1, wherein the operation of generating the second extrinsic calibration parameter further comprises the following operations:

generating, based on a coordinate system corresponding to the base image capturing device pose, a three-dimensional coordinate information corresponding to the coordinate system of each of the light-emitting points; and performing a bundle adjustment based on the first extrinsic calibration parameter and the three-dimensional coordinate information corresponding to the coordinate system corresponding to each of the light-emitting points to generate the second extrinsic calibration parameter.

10. The extrinsic calibration parameter generating device of claim 1, wherein the image frames are generated by the at least two image capturing devices based on different image capture angles.

11. A extrinsic calibration parameter generating method, being adapted for use in an electronic apparatus, wherein the electronic apparatus comprises at least two image capturing devices, each of the at least two image capturing devices is configured to generate an image frame, and each of the image frames includes a plurality of light-emitting points on an external device, and the extrinsic calibration parameter generating method comprises:

calculating a base image capturing device pose based on the light-emitting points of the image frames;

generating a first extrinsic calibration parameter corresponding to the at least two image capturing devices based on the image frames, wherein the first extrinsic calibration parameter is a five-degree-of-freedom information; and generating a second extrinsic calibration parameter corresponding to the at least two image capturing devices based on the base image capturing device pose and the first extrinsic calibration parameter, wherein the second extrinsic calibration parameter is six-degree-of-freedom information.

12. The extrinsic calibration parameter generating method of claim 11, wherein the extrinsic calibration parameter generating method further comprises the following steps:

calibrating a positioning information corresponding to the at least two image capturing devices based on the second extrinsic calibration parameter.

13. The extrinsic calibration parameter generating method of claim 11, wherein the base image capturing device pose corresponds to one of the at least two image capturing devices.

14. The extrinsic calibration parameter generating method of claim 11, wherein the step of calculating the base image capturing device pose further comprises the following steps:

calculating the base image capturing device pose based on a three-dimensional coordinate information of each of the light-emitting points and a two-dimensional feature pairing information.

15. The extrinsic calibration parameter generating method of claim 14, wherein the step of calculating the two-dimensional feature pairing information further comprises the following steps:

comparing the light-emitting points of each of the image frames to calculate the two-dimensional feature pairing information corresponding to the image frames.

16. The extrinsic calibration parameter generating method of claim 14, wherein the step of calculating the three-dimensional coordinate information of each of the light-emitting points further comprises the following steps:

calculating the three-dimensional coordinate information of each of the light-emitting points based on the two-dimensional feature pairing information and a distance relationship between the light-emitting points on the external device.

17. The extrinsic calibration parameter generating method of claim 14, wherein the image frames are generated by the at least two image capturing devices based on a low exposure value parameter.

18. The extrinsic calibration parameter generating method of claim 11, wherein each of the light-emitting points is further configured to emit an infrared ray, and the extrinsic calibration parameter generating method further comprises the following steps:

performing a tracking operation corresponding to the external device based on the infrared rays emitted by each of the light-emitting points.

19. The extrinsic calibration parameter generating method of claim 11, wherein the step of generating the second extrinsic calibration parameter further comprises the following steps:

generating, based on a coordinate system corresponding to the base image capturing device pose, a three-dimensional coordinate information corresponding to the coordinate system of each of the light-emitting points; and performing a bundle adjustment based on the first extrinsic calibration parameter and the three-dimensional coordinate information corresponding to the coordinate system corresponding to each of the light-emitting points to generate the second extrinsic calibration parameter.

20. A non-transitory computer readable storage medium, having a computer program stored therein, wherein the computer program comprises a plurality of codes, the computer program executes a extrinsic calibration parameter generating method after being loaded into an electronic apparatus, the electronic apparatus comprises at least two image capturing devices, each of the at least two image capturing devices is configured to generate an image frame, and each of the image frames includes a plurality of light-emitting points on an external device, the extrinsic calibration parameter generating method comprises:

calculating a base image capturing device pose based on the light-emitting points of the image frames;

generating a first extrinsic calibration parameter corresponding to the at least two image capturing devices based on the image frames, wherein the first extrinsic calibration parameter is a five-degree-of-freedom information; and generating a second extrinsic calibration parameter corresponding to the at least two image capturing devices based on the base image capturing device pose and the first extrinsic calibration parameter, wherein the second extrinsic calibration parameter is six-degree-of-freedom information.

* * * * *